United States Patent [19]
Waber

[11] Patent Number: 6,095,487
[45] Date of Patent: Aug. 1, 2000

[54] DRIVE ARRANGEMENT FOR AN ACTUATOR

[75] Inventor: Christian Waber, Baar, Switzerland

[73] Assignee: Electrowatt Technology Innovation AG, Zug, Switzerland

[21] Appl. No.: 09/271,604

[22] Filed: Mar. 17, 1999

[30] Foreign Application Priority Data

Mar. 12, 1999 [DE] Germany ............... 299 04 620 U

[51] Int. Cl.⁷ .................................................. F16K 31/02
[52] U.S. Cl. ............................. 251/129.11; 251/129.01
[58] Field of Search ............... 251/129.11, 129.12, 251/129.01, 65

[56] References Cited

U.S. PATENT DOCUMENTS

| | | | |
|---|---|---|---|
| 2,533,491 | 12/1950 | McMahon et al. | 251/65 X |
| 2,569,800 | 10/1951 | Cataldo | 251/65 X |
| 3,347,262 | 10/1967 | Gibson | 251/65 X |
| 4,976,227 | 12/1990 | Draper | 251/129.11 |
| 5,283,023 | 2/1994 | Kristoffer | 251/129.11 X |
| 5,345,968 | 9/1994 | Day | 251/129.11 X |

*Primary Examiner*—John Rivell
*Assistant Examiner*—Meredith H Schoenfeld
*Attorney, Agent, or Firm*—Proskauer Rose LLP

[57] ABSTRACT

A drive arrangement for an axle (4) for the actuation of an actuating element (3) comprises a first drive unit (1) coupled to the axle (4) and a second drive unit (2) coupled to the axle (4). A lever (21) mounted pivotably on a holding system (24, 26) in a pivot point (20) engages the first drive unit (1) on the one hand and the second drive unit (2) on the other hand. Thanks to the lever (21), the two drive units (1, 2) can be twisted within certain limits relative to each other around the axle (4) to compensate for position errors.

5 Claims, 4 Drawing Sheets

DRIVE ARRANGEMENT FOR AN ACTUATOR

The invention relates to a drive arrangement of the type mentioned in the introductory clause of claim 1.

Such drive arrangements are used advantageously in heating, ventilation and air-conditioning technology to actuate devices such as valves or butterfly valves.

A drive arrangement of this type, in which two drive units acting on a common shaft which are secured against twisting independently from each other and are mounted on a support plate is known from the data sheet M46131 of Jul. 7, 1997. Due to manufacturing tolerances position errors between the two drive units occur following an actuating signal because the two drive units react to the common drive shaft with drive movements that vary slightly from each other.

It is the object of the present invention to propose a drive arrangement with two drive units acting upon a common axle or shaft in which position errors of the drive units can be compensated for.

The above-mentioned object is attained according to the invention through the characteristics of claim 1. Advantageous embodiments are derived from the dependent claims.

Examples of embodiments of the invention are explained in further detail below, through drawings.

Figure 1:
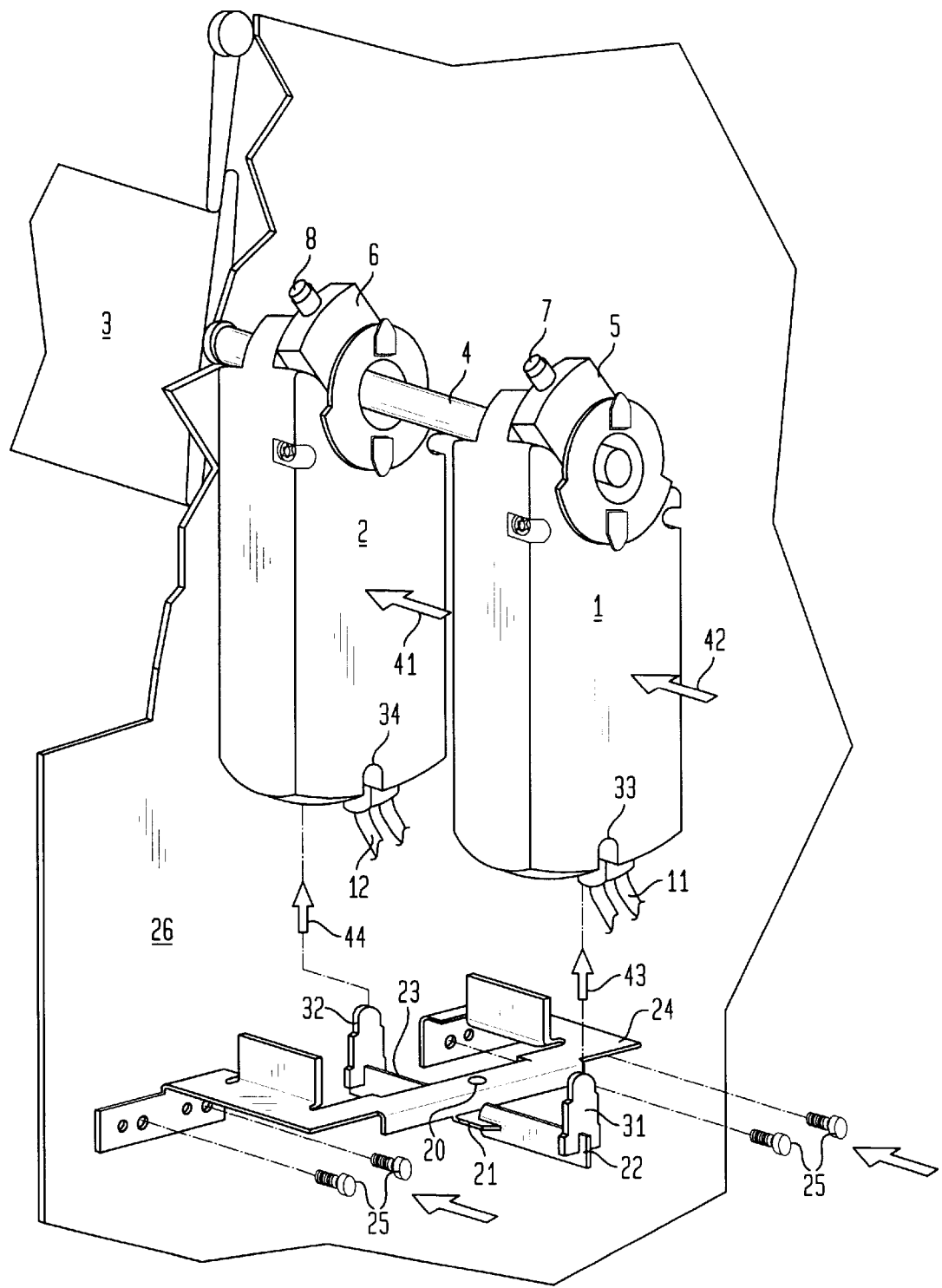
FIG. 1 shows a drive arrangement with two drive units

In FIG. 1 the reference 1 represents the first drive unit and 2 a second drive unit for the actuation of an actuator 3. The actuator 3, a venting butterfly valve in the example, can be actuated via the common axle 4 of the two drive units 1 and 2. The first drive unit 1 is equipped with a driving dog 5 for the transmission of a rotational movement of the drive unit 1 to the axle 4. In an identical manner the second drive unit 2 is connected via another driving dog 6 to the axle 4. Advantageously the axle 4 is connected by means 7 or 8 respectively to the driving dog 5 or 6 respectively in a removable manner. The device 7 or 8 is e.g. a screw through which the clamping connection between he first drive unit 1 and the axle 4 or between the second drive unit 2 and the axle 4 is established or disconnected. An advantageous embodiment of the device 5 or 6 is described in U.S. Pat. No. 5,544,970.

The first drive unit 1 is provided with a connection 11 for an electrical actuating signal S. An additional connection 12 for the electrical actuating signal S belongs to the second drive unit 2.

A swiveling lever 21 is provided with a first lever arm 22 and a second lever arm 23 relative to the pivot point 20. The lever 21 is attached to a shackle 24 so as to be capable of swiveling, said shackle 24 being attached by connection means 25 to a housing element 26. The first lever arm 22 is provided with a first coupling element 31 for the coupling of lever 21 to the first drive unit 1, while the second lever arm 23 is provided with a second coupling element 32 for the coupling of the lever 21 to the second drive unit 2.

A first coupling zone 33 is formed on the first drive unit 1 and a second coupling zone 34 is formed on the second drive unit 2. The first coupling zone 33 and the first coupling element 31 are designed and coordinated with each other in such manner that the lever 21 can be coupled on the one hand mechanically via the first lever arm 22 to the first drive unit 1, while the second coupling zone 34 and the second coupling element 32 are designed and coordinated with each other in such manner that the lever 21 can be coupled on the other hand mechanically via the second lever arm 23 to the second drive unit 1.

Arrows indicate in FIG. 1 how an advantageous drive arrangement with which the two drive units 1 and 2 are provided to actuate the actuating element 3 can be mounted. A first arrow 41 and a second arrow 42 indicate that the two drive units 2 and 1 are pushed over the common axle 4 and are attached by means of devices 8 and 7 to the axle. A third arrow 43 and a fourth arrow 44 indicate that the shackle 24 is mounted on the housing element 26 together with lever 21 in such manner that the first coupling element 31 engages the first coupling zone 33 and the second coupling element 32 engages the second coupling zone 34.

Figure 2:
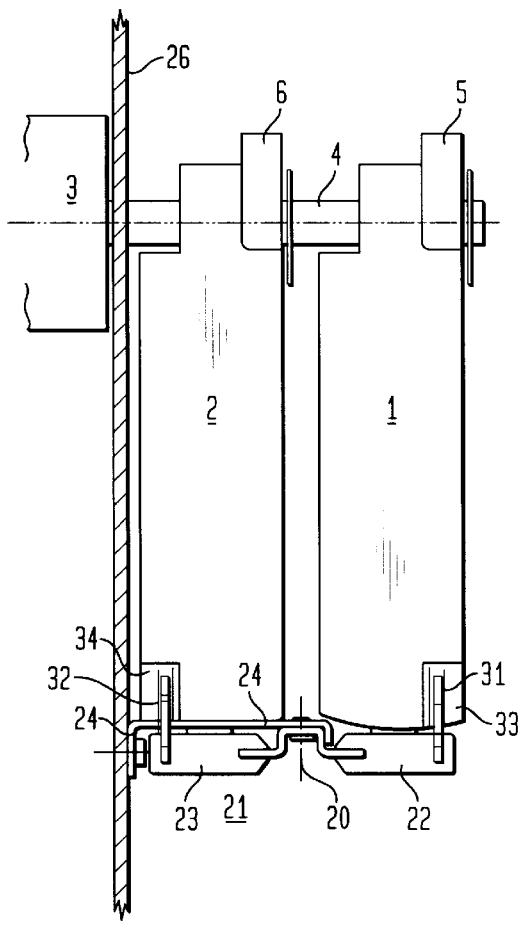
FIG. 2 shows the two drive units coupled to each other via a swiveling lever.

The drive arrangement shown in perspective in FIG. 1 is shown in its mounted state in FIG. 2, whereby the same reference numbers are of course used for identical parts.

The first coupling zone 33 and the second coupling zone 34 are advantageously installed on the drive unit 1 or 3 and designed so that the lever 21 is engaged at the first drive unit 1 and at the second drive unit 2 symmetrically relative to the pivot point 20. The two drive units 1 and 2 are mechanically coupled together via the lever 21 and the levers 22 and 23 which are preferably of equal length. The first coupling zone 33 and the second coupling element 32 are designed and coordinated with each other in such manner that the two drive units 1 and 2 can be rotated relative to each other around axle 4 within a given swing angle range, whereby said rotation of the drive units 1 and 2 is made in principle possible with a rotation of lever 21 around pivot point 20.

Said rotation of the drive units 1 and 2 requires that the first coupling element 31 be able to move in the first coupling zone 33 and that the second coupling element 32 be able to move in the second coupling zone 34.

Insofar as the two drive units 1 and 2 develop unequal drive-torque forces, the active lengths of the two lever arms 22 and 23 should advantageously be coordinated to maintain the symmetry between the two drive units 1 and 2.

The shackle 24 which is preferably mounted on a housing element 26 constitutes a holding device for the two drive units 1 and 2 which are secured against an unlimited rotational movement around axle 4 by the lever 21 mounted rotatably in the pivot point 20.

Figure 3:
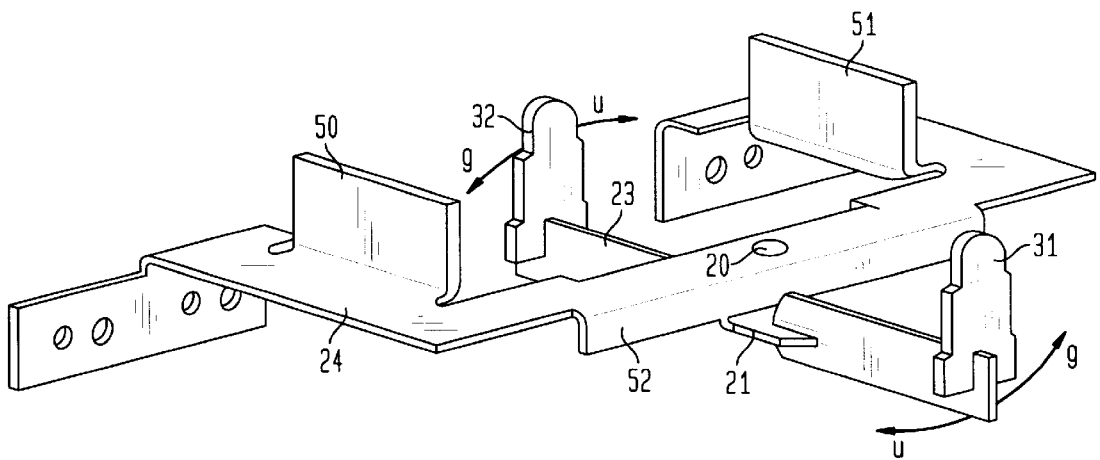
FIG. 3 shows the swiveling lever.

FIG. 3 shows the lever 21 already shown in FIGS. 1 and 2, together with the shackle 24 slightly enlarged, so that details of the advantageous design can easily be recognized. Of course the same parts are again given the same references.

The lever 21 mounted rotatably in the pivot point 20 is mobile at least within certain limits in a clockwise direction and/or in a counterclockwise direction. The lever 21 can be made of metal through known processes, such as e.g. punching out, bending, soldering or welding. The strength of the lever 21 is to be determined in a known manner in function of the requirements for the transmission of torque between the coupled drive units. In principle the lever 21 can also be made of plastic. In an advantageous embodiment the coupling elements 31 and 32 are made in form of tabs or wings on the lever arms 22 and 23. The coupling elements 31 and 32 in form of tabs or wings can also be used as stop for a maximum rotational movement between the two drives 1 and 2 around the axle 4 if the coupling zones 33 and 34 have a configuration which limits the necessary motion possibility of the coupling elements 31 and 32 accordingly in the coupling zones 33 and 34.

In another advantageous embodiment the two coupling elements 31 and 32 are substantially in form of cylinder-shaped pegs so that an especially friction-free mechanical coupling of the two lever arms 22 and 23 with the corresponding drive units 1 or 2 can be achieved.

The shackle 24 has the task of fixing the lever 21 rotatably in the pivot point 20. It goes without saying that this task can be accomplished in principle through a number of possible designs. In an advantageous solution the shackle 24 is a punch-out and bent part made of metal, and its rigidity is increased by ridges or flanges 50, 41 and 52 which are bent up. The shackle 24 allows for the universal mounting of the lever 21 and thereby the rotatable attachment of the two drive units 1 and 2 to a great number of variants of the actuating element 3. It goes without saying that the shackle 24 can also be formed directly on an immobile part of the actuating element 3. Depending on what is needed, the ridge or flange 52 can then be designed so that it may also be used as a stop for the possible rotational movement of level 21 in the two opposite directions g and u.

Two stops facing each other for the drive units 1 and 2 are advantageously provided in the area of the end of drive units 1 and 2 furthest away from the axle 4 to determine the limits of the maximum possible rotational movement of the drive units 1 and 2 in clockwise and counterclockwise direction around axle 4.

In an especially advantageous embodiment of the shackle 24, the two flanges 50 and 51 are placed and sized in such manner that only they will limit a maximum possible rotational movement of the two drive units 1 and 2 around the common axle 4. Thereby the limits of a maximum possible twist between the two drive units 1 and 2 for the compensation of position errors are reached when one of the two drive units 1 or 2 impacts a first flange 50, and the other of the two drive units 1 or 2 impacts the second flange 51 across from the flange 50. Typical values for a maximum admissible twist between the two drive units 1 and 2 are approximately 20 to 30 degrees. It goes without saying that the maximum possible twist can be coordinated within wide limits with the expected deviations of the actuation response of the two drive units 1 and 2.

The arrangement of two flanges 50 and 51 facing each other by which the maximum possible twist between the two drive units 1 and 2 is limited has the advantage that this design can be used safely and reliably even with relatively high torque forces of the two drive units 1 and 2. In addition it is possible, with the configuration of the two flanges 50 and 51, to ensure that the two drive units 1 and 2 remain securely held on the axle 4, even when the driving dog 5 or 6 should accidentally become loose. The two flanges 50 and 51 can thus prevent damage through accidental loosening and dropping of the drive unit 1 or 2.

Figure 4:
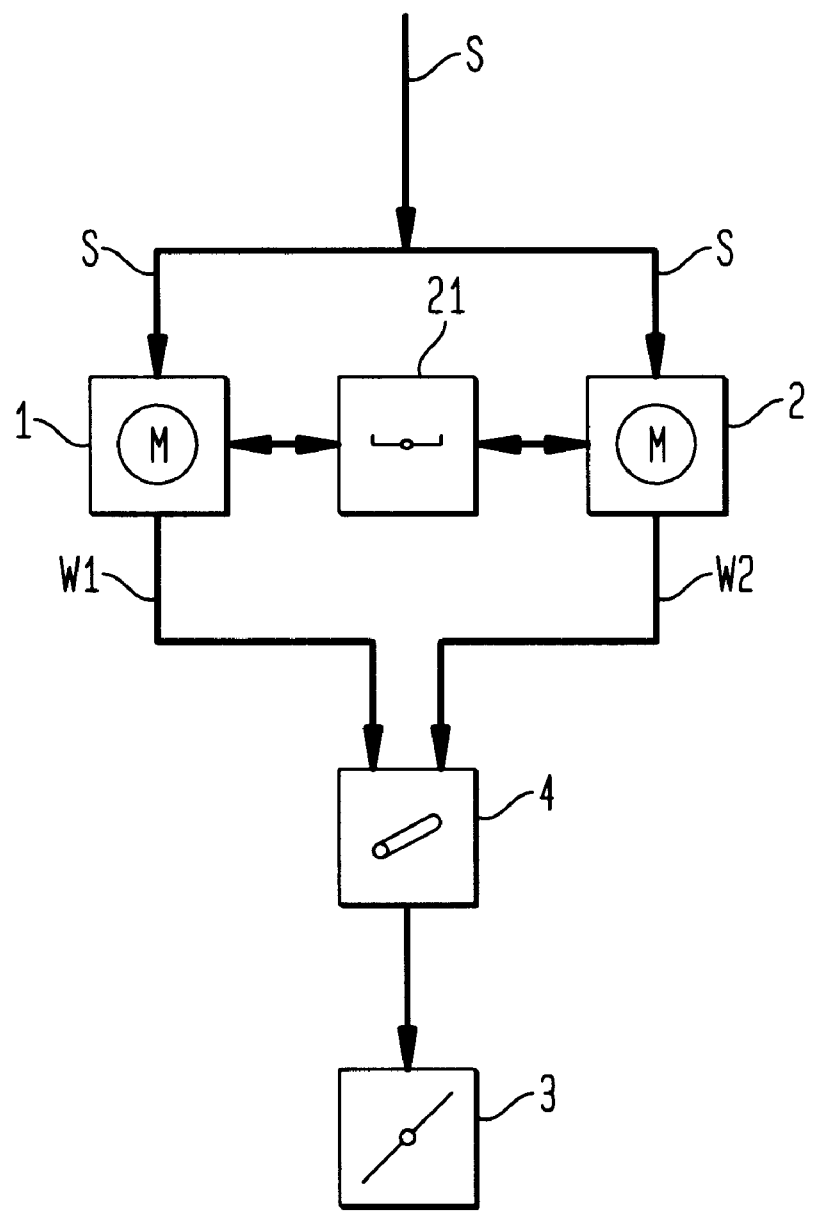
FIG. 4 is a diagram of the basic layout of the drive arrangement

In order to present an understandable representation of the action of the arrangement, FIG. 4 shows in form of function blocks the drive units 1 and 2 which are mechanically coupled together via lever 21, the axle 3 which can be driven by the two drive units 1 and 2 and the actuating element 3 which can be actuated via axle 3.

In principle the drive unit 1 or 2 reacts to an electrical actuating signal S with a rotational movement of the axle 4 caused by a motor, around an angle of rotation corresponding to the actuating signal S. Due to manufacturing tolerances, measuring errors or errors in the feedback circuit, position tolerances result between the two drive units 1 and 2 upon an actuating signal because the two drive units 1 and 2 react with drive movements w1 or w2 on the common axle 4 that vary slightly from each other. Due to the fact that the two drive units 1 and 2 can be rotated within certain limits around axle 4 relative to each other thanks to the lever 21, said position tolerances can be compensated for, whereby the torque forces which can be transmitted to the common axle 4 take effect between the two drive units 1 and 2 via the common lever 21. The compensation for the position tolerances between the two drive units 1 and 2 is made possible by a slight rotational movement of the lever 21 around the pivot point 20. Typical values of maximum position tolerances between the two drive units are approximately plus or minus five degrees, resulting in a certain rotational movement of the lever 21 around pivot point 20, depending on the geometry of the drive units 1 and 2.

Figure 5:
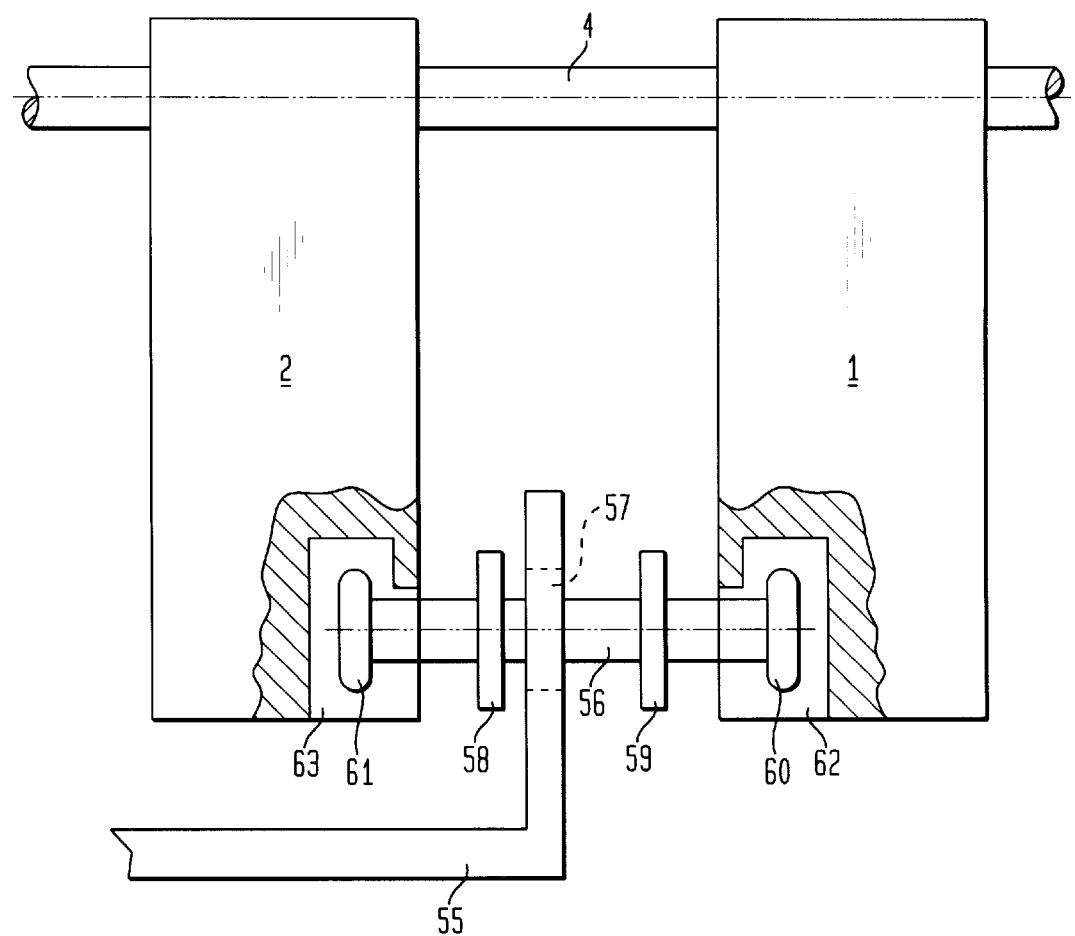
FIG. 5 is a variant of the drive arrangement in an elevation drawing

In a variant of the drive arrangement shown in FIG. 5, the function of the lever 21 attached to the holding arrangement 24, 26 described in FIGS. 1 to 4 is implemented by a pin 56 traversing the support 55. The support 55 may be formed on the housing element 26 (FIG. 1) for example, or can be attached to it, and is provided with a hole 57 for the passage of the bolt 56. At least one step 59 can be in form of a locking disk or by a locking ring to allow for easy assembly.

Figure 6:
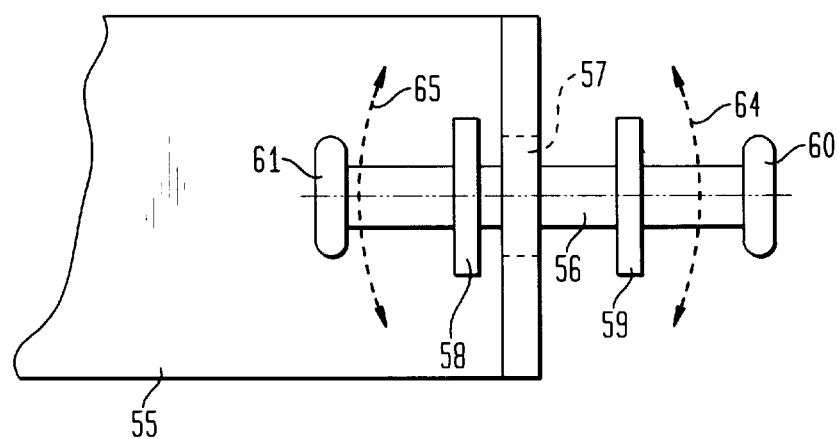
FIG. 6 is a detail of the variant of FIG. 5, in a ground plan.

The functionality of the coupling elements 31, 32 described through FIGS. 1 to 4, in combination with the coupling zones 33 and 34, is realized in the embodiment shown in FIGS. 5 and 6 by bolt heads 60 and 61 which engage recesses 62 and 63 in a movable manner. The recesses 62 and 63 are coordinated in form with the bolt heads 60 and 61 in the two drive units 1 and 2. The opening 57 is sized and coordinated with the bolts 56 in such manner that a movement of the bolt 56 in the direction of the double arrows 64 and 65 is made possible when the two drive units 1 and 2 are twisted (FIG. 6).

In principle however, an embodiment of the drive arrangement with a lever 21 (FIG. 2) is to be preferred to an embodiment with a bolt 56, inasmuch as the degree of effectiveness or the magnitude of the torque forces to be transmitted to the axle 4 are important, because with the embodiment according to FIGS. 5 and 6, always smaller lever arms can be obtained than in the embodiment according to FIG. 2, in which the coupling elements 31 and 32 are advantageously engaged on the sides of the drive units 1 and 2 further away from each other.

What is claimed is:

1. Drive arrangement for an axle (4) for the actuation of an actuating element (3), with a first drive unit (1) coupled to the axle (4) and a second drive unit (2) coupled to the axle (4), characterized by a lever (21) pivoting in a pivot point (20) and attached to a holding system (24, 26), engaging on the one hand at the first drive unit (1) and on the other hand at the second drive unit (2) and by means of which the two drive units (1; 2) are coupled together and attached to the holding system (24, 26) in such manner that the first drive unit (1) and also the second drive unit (2) are able to rotate around the axle (4) in order to compensate for position errors.

2. Drive arrangement as in claim 1, characterized in that the lever (21) has two lever arms (22; 23) symmetrically laid out relative to each other which start out at the pivot point (20) of the lever (21), whereby a first lever arm (22) engages the first drive unit (1) and the second lever arm (23) engages the second drive unit (2).

3. Drive arrangement as in claim 1, characterized in that the lever (21) is designed and attached in the pivot point (20)

on the holding system (24, 26) in such manner that the drive unit (1; 2) can be rotated around the axle (4) within certain limits.

4. Drive arrangement as in claim 3, characterized in that two stops (50, 51) for the drive unit (1; 2) are provided on the holding system (24, 26) in proximity of the end of the drive units (1; 2) furthest from the axle 4, whereby the limits of the maximum possible rotational movement of the drive unit (1; 2) in clockwise and counterclockwise direction around the axle (4) are determined by said stops (50, 51).

5. Drive arrangement as in claim 1, characterized in that limiting means are formed on the lever (21) by means of which limits of a maximum possible rotational movement of the lever (21) around the pivot point (20) is determined.

* * * * *